United States Patent
Kappert et al.

(10) Patent No.: US 12,078,512 B2
(45) Date of Patent: Sep. 3, 2024

(54) DUAL CHANNEL DETECTOR WITH DIFFERENT MEASUREMENT SIGNALS

(71) Applicant: TDK Electronics AG, Munich (DE)

(72) Inventors: Sandro Kappert, Graz (AT); Stefan Sax, Graz (AT)

(73) Assignee: TDK ELECTRONICS AG, Müchen (DE)

( * ) Notice: Subject to any disclaimer, the term of this patent is extended or adjusted under 35 U.S.C. 154(b) by 275 days.

(21) Appl. No.: 17/639,725

(22) PCT Filed: Nov. 18, 2020

(86) PCT No.: PCT/EP2020/082558
§ 371 (c)(1),
(2) Date: Mar. 2, 2022

(87) PCT Pub. No.: WO2021/104967
PCT Pub. Date: Jun. 3, 2021

(65) Prior Publication Data
US 2022/0291017 A1    Sep. 15, 2022

(30) Foreign Application Priority Data
Nov. 28, 2019 (DE) .......................... 102019132356.8

(51) Int. Cl.
*G01D 3/08* (2006.01)
*G01L 1/16* (2006.01)

(52) U.S. Cl.
CPC . *G01D 3/08* (2013.01); *G01L 1/16* (2013.01)

(58) Field of Classification Search
CPC ... G01R 31/3187; G01M 99/007; G01D 3/08; G01L 1/165; G01L 1/162; G01L 1/16
See application file for complete search history.

(56) References Cited

U.S. PATENT DOCUMENTS

| | | | |
|---|---|---|---|
| 3,940,637 A | 2/1976 | Ohigashi | |
| 4,071,785 A | 1/1978 | Masafumi | |
| 4,734,044 A * | 3/1988 | Radice | H10N 30/875 310/365 |
| 5,668,331 A * | 9/1997 | Schintag | G01D 5/345 324/207.2 |

(Continued)

FOREIGN PATENT DOCUMENTS

| CN | 102016516 A | 4/2011 |
|---|---|---|
| DE | 2619339 A1 | 11/1976 |

(Continued)

OTHER PUBLICATIONS

International Search Report and Written Opinion of International Searching Authority corresponding to International Patent Application No. PCT/EP2020/082558, with English translation of the Search Report, mailed Feb. 15, 2021 (13 pages).

(Continued)

*Primary Examiner* — Tran M. Tran
(74) *Attorney, Agent, or Firm* — Nixon Peabody LLP

(57) ABSTRACT

A dual channel detector. The first channel includes a first sensor and the second channel includes a second sensor, which are deposited on a substrate. The first and second sensors measure the same physical quantity, but output different measurement signals. The sensors are connected to evaluation units via contact points.

16 Claims, 3 Drawing Sheets

(56) References Cited

U.S. PATENT DOCUMENTS

| | | | | |
|---|---|---|---|---|
| 6,278,389 | B1* | 8/2001 | Lochmann | G01P 21/02 |
| | | | | 341/118 |
| 6,323,580 | B1* | 11/2001 | Bernstein | H10N 30/2047 |
| | | | | 310/365 |
| 6,502,459 | B1 | 1/2003 | Bonne | |
| 7,015,702 | B2* | 3/2006 | Rupp | G01R 19/252 |
| | | | | 324/609 |
| 7,086,270 | B2* | 8/2006 | Weinberg | G01D 21/00 |
| | | | | 73/1.38 |
| 7,552,615 | B2* | 6/2009 | Kuwata | F16H 59/105 |
| | | | | 73/1.75 |
| 8,272,246 | B2* | 9/2012 | Andarawis | G01B 21/042 |
| | | | | 73/1.79 |
| 9,500,668 | B2* | 11/2016 | Broillet | H04B 3/46 |
| 9,506,996 | B2* | 11/2016 | Granig | G01R 33/09 |
| 9,638,762 | B2* | 5/2017 | Scherr | G01R 33/093 |
| 9,874,609 | B2* | 1/2018 | Rasbornig | G01R 31/3187 |
| 9,983,032 | B1* | 5/2018 | Kraver | G01R 27/26 |
| 10,031,155 | B2* | 7/2018 | Procopio | G01L 1/16 |
| 10,031,176 | B2* | 7/2018 | Aoyama | G01D 3/08 |
| 10,145,882 | B2* | 12/2018 | Rasbornig | B60T 8/885 |
| 10,168,235 | B1* | 1/2019 | Chuang | G01L 5/0052 |
| 10,288,426 | B2* | 5/2019 | Aoyama | G01D 3/08 |
| 10,393,768 | B2* | 8/2019 | Thompson | G01P 15/125 |
| 10,490,060 | B2* | 11/2019 | Motz | H03M 1/1205 |
| 10,514,410 | B2* | 12/2019 | Rasbornig | G01R 31/007 |
| 10,580,289 | B2* | 3/2020 | Haas | H04L 25/4902 |
| 10,636,285 | B2* | 4/2020 | Haas | G01R 33/09 |
| 10,641,809 | B2* | 5/2020 | Zettler | G01R 29/26 |
| 10,677,620 | B2* | 6/2020 | Meyer | G01R 1/14 |
| 10,830,608 | B2* | 11/2020 | Yamaguchi | G01D 3/02 |
| 11,085,976 | B2* | 8/2021 | Bilbao De Mendizabal | |
| | | | | G01R 33/0029 |
| 11,346,728 | B2* | 5/2022 | Lim | G01L 1/16 |
| 11,449,082 | B1* | 9/2022 | Lindemann | G08B 25/10 |
| 11,460,522 | B2* | 10/2022 | Schapendonk | G01R 33/0088 |
| 11,500,020 | B2* | 11/2022 | Marinov Peev | G01D 18/00 |
| 11,619,555 | B2* | 4/2023 | Nagamori | H10N 30/302 |
| | | | | 73/862.625 |
| 11,796,557 | B2* | 10/2023 | Fontanesi | G01P 3/487 |
| 11,860,203 | B2* | 1/2024 | Giolbas | G01R 25/00 |
| 11,914,007 | B2* | 2/2024 | Hammerschmidt | |
| | | | | G01R 33/0023 |
| 2003/0056586 | A1 | 3/2003 | Ueki | |
| 2005/0000293 | A1 | 1/2005 | Kandler | |
| 2008/0012557 | A1 | 1/2008 | Hammerschmidt | |
| 2008/0190166 | A1* | 8/2008 | Hahn | G05B 19/39 |
| | | | | 73/1.01 |
| 2010/0181871 | A1 | 7/2010 | Daniel | |
| 2010/0301706 | A1* | 12/2010 | Koury, Jr. | G01L 9/008 |
| | | | | 310/338 |
| 2011/0037456 | A1 | 2/2011 | Chemisky | |
| 2013/0155631 | A1 | 6/2013 | Yamauchi | |
| 2013/0200909 | A1 | 8/2013 | Rasbornig | |
| 2015/0008907 | A1 | 1/2015 | Janisch | |
| 2015/0221523 | A1 | 8/2015 | Scherr | |
| 2015/0339001 | A1 | 11/2015 | Zirkl | |
| 2016/0211778 | A1 | 7/2016 | Okada | |
| 2017/0227614 | A1 | 8/2017 | Scherr | |
| 2019/0250049 | A1 | 8/2019 | Harada | |
| 2019/0339141 | A1 | 11/2019 | Gisby | |
| 2020/0041364 | A1 | 2/2020 | Nagamori | |
| 2020/0052695 | A1 | 2/2020 | Bauer | |
| 2020/0173887 | A1* | 6/2020 | Onishi | G05B 23/0218 |
| 2022/0146350 | A1* | 5/2022 | Kawano | B62D 5/049 |
| 2023/0280240 | A1* | 9/2023 | Oka | G05B 23/0278 |
| | | | | 73/865.8 |

FOREIGN PATENT DOCUMENTS

| | | |
|---|---|---|
| DE | 10329665 A1 | 2/2005 |
| DE | 102015102581 A1 | 8/2017 |
| DE | 102016108293 A1 | 11/2017 |
| EP | 0203261 A1 | 12/1986 |
| EP | 2893423 A1 | 7/2015 |
| GB | 2569578 A | 6/2019 |
| JP | S54-23766 B2 | 8/1979 |
| JP | H08-114408 A | 5/1996 |
| JP | H08-304446 A | 11/1996 |
| JP | H11-230980 A | 8/1999 |
| JP | 2012-160620 A | 8/2012 |
| JP | 2015-050889 A | 3/2015 |
| JP | 2015-508899 A | 3/2015 |
| JP | 2017-005526 A | 1/2017 |
| WO | WO 8102223 A1 | 8/1981 |
| WO | WO 2009/011605 A2 | 1/2009 |
| WO | WO 2013/027736 A1 | 2/2013 |
| WO | WO 2014/037016 A1 | 3/2014 |
| WO | WO 2019/078144 A1 | 4/2019 |

OTHER PUBLICATIONS

Rendl, C. et al.; "PyzoFlex: Printed Piezoelectric Pressure Sensing Foil"; Proceedings of the 25th Annual ACM Symposium on User Interference Software and Technology; UIST'12, pp. 509-518; Oct. 2012; DOI: 10.1145/2380116.238018 (11 pages).

Zirkl, M. et al.; "Pyzo Flex: a printed piezoelectric pressure sensing foil for human machine interfaces"; Proceedings of SPIE vol. 8831, pp. 883124-1-883124-8; Organic Field-Effect Transistors XII; and Organic Semiconductors in Sensors and Bioelectronics VI; copyright 2013 SPIE; DOI: 10.1117/12.2025235; retrieved from http://proceedings.spiedigitallibrary.org/ (9 pages).

Examination Report in related Japanese Patent Application No. 2022-514206, in Japanese, dated Jun. 7, 2023 (8 pages).

Examination Report in related Chinese Patent Application No. 202080063313.5, in Chinese, dated Sep. 1, 2023 (8 pages).

\* cited by examiner

DUAL CHANNEL DETECTOR WITH DIFFERENT MEASUREMENT SIGNALS

CROSS-REFERENCE TO RELATED APPLICATIONS

This application is a U.S. National Stage of International Application No. PCT/EP2020/082558, filed Nov. 18, 2020, which claims the benefit of German Patent Application No. 102019132356.8, filed Nov. 28, 2019, both of which are incorporated herein by reference in their entireties.

The invention relates to a dual channel detector comprising first sensors and second sensors on a substrate.

The ever closer spatial and temporal interaction between human and machine means that conventional technologies in sensor technology can only be used to a limited extent or have to be completely redesigned for collaborative operation. The main focus is on the detection and avoidance of collisions of any kind or the safe stopping of the machine in case of a collision. This requires suitable detectors and sensor systems. In addition, such detectors and sensor systems must basically be able to detect occurring internal functional errors. Such errors can occur, for example, due to faulty detection by the sensor or faulty signal processing by the electronics.

The respective sensor systems have different monitoring ranges depending on the technology used. For example, optical and acoustic systems are used more for the detection of larger distances and systems based on contact protection strips are used for detection in the immediate vicinity.

However, classic contact detection systems are only suitable to a limited extent for the contact detection of machines in collaborative operation. According to the hazard analysis of the respective process, the potentially dangerous parts of a machine must be equipped with suitable sensor technology in each case.

From US 2010/0181871 A1 a pressure sensitive detector applicable for this purpose is known, which can detect a mechanical deformation by means of a piezo active pressure sensitive layer and goes back to the original position after detection.

WO 2009/011605 A2 further describes a flat, single-layer pressure sensor with a ferroelectric functional layer made of the plastic polyvinylidene fluoride (PVDF).

In the publication "PyzoFlex: Printed Piezoelectric Pressure Sensing Foil", Christian Rendl et al., 2012, UIST'12—Proceedings of the 25th Annual ACM Symposium on User Interface Software and Technology, a sensor is disclosed that responds to both pressure and heat due to the properties of the material of its functional layer. An evaluation unit connected to the sensor evaluates its signal and distinguishes between pressure and heat.

A printed touch sensor is known from WO 2014/037016 A1. Here, to improve local resolution, two independent sensor layers are arranged on the same side or on the two opposite sides of a substrate in such a way that the individual sensor points contained in the layers are congruent.

From DE 26 19 339 A1, arrangements with two sensor layers arranged vertically one above the other are known, whereby the two sensor layers can have different polarities. The functionality of the sensor system is neither improved nor worsened by this.

It is also known that a sensor matrix can be used to achieve spatial resolution of a physical quantity to be detected.

One problem of known sensor arrangements is that malfunctions of the sensor technology or the processing electronics cannot be detected without further aids.

Therefore, the object of the present invention is to provide a detector that implicitly enables the detection of measurement and signal processing errors.

This object is solved by a dual channel detector described in claim 1. Further embodiments of the detector are to be taken from the further claims.

A dual channel detector is provided comprising a substrate having first and second sensors disposed thereon. A first channel comprises a first sensor that generates a first measurement signal. A second channel comprises a second sensor mounted on the substrate laterally adjacent to the first sensor and generating a second measurement signal. The second measurement signal represents the same physical quantity as the first measurement signal, but is different from the first measurement signal. Further, both the first and second channel include evaluation units connected to the respective sensors via contact points. By detecting the same physical quantity by the first and second sensors, a faulty function of the detector can be detected. Namely, when different values are obtained for the same measurand. If the measurand is only output by one of the channels, there is a serious error in the other.

The difference between the measurement signal of the first and second channel can be a different polarity of the two signals. This can be caused, for example, by different polarization of the first and second sensors. The electrical polarization of the sensor has the advantage that a direction-dependent detection is possible based on the polarity of the measurement signal. Furthermore, the different polarity of the first and second sensors serves to further control a malfunction of the detector. If there is no error, the first channel and the second channel output the same measurement signal with exactly opposite polarity. If the two measurement signals are not present with exactly opposite polarity, there is an error in the evaluation units or the downstream electronics. If the measurement signals of the first and second channel have the same polarity, a serious error is present in the evaluation units or the downstream electronics.

Furthermore, the dual-channel detector can be designed in such a way that all sensors detect the physical quantity simultaneously. Thus, the measurement signals of the first and second sensors can be compared immediately and time delays can be avoided.

In another form, the detector may be designed such that the first and second sensor output phase-shifted measurement signals. This shift can be caused, for example, by different polarities of the first and second sensors. The phase-shifted measurement signals have the advantage that they allow further control of a malfunction of the detector. If both measurement signals are not exactly phase-shifted, there is an error in the evaluation units or the downstream electronics. If the both measurement signals are not phase-shifted, there is an extreme error in the evaluation units or the downstream electronics.

In a further embodiment, the detector can be designed such that the first and second sensors output measurement signals are 180° phase-shifted with each other. These clearly phase-shifted measurement signals have the advantage that they further facilitate the detection of a malfunction of the detector in the case of symmetry (both measurement values with the same magnitude but opposite polarity/opposite sign). If the two measurement signals are not symmetrical, there is an error in the evaluation units or the downstream electronics. If the two measurement signals are not phase-shifted, a serious error is present in the evaluation units or the downstream electronics.

In a further embodiment, the contact points between sensors and evaluation units are mechanically decoupled. This means that the sensor can be changed or deformed by external impacts such as changes in temperature and pressure or the effects of forces without a detrimental effect on the evaluation units. The mechanical decoupling can be achieved by an electro-mechanical connection of the sensors to the evaluation units. For example, the evaluation unit can be located on an FR4 board, which is electro-mechanically connected to the respective sensor. In one embodiment, the evaluation units may be located directly on the substrate, together with the sensors. Additionally, the evaluation unit may be spatially separated from the respective sensor. The measurement signal can be transmitted via an electro-mechanical connection or via a wireless connection.

In a further embodiment, the evaluation units, the contact points and parts of the sensors are encapsulated, which protects them from damaging external impacts caused by changes in pressure and temperature or the application of force. By enclosing the entire detector with an elastic material, it can be further protected. Furthermore, the enclosure can ensure that the first and second sensors detect the same physical quantity.

In at least one further embodiment, the first and second sensors comprise two spaced electrodes disposed on the same or opposite sides of a functional layer. The electrodes and the functional layer may be printed on the substrate. This allows a high degree of freedom in the design of geometry or shape of the sensor. For example, also several sensors may be combined to form a sensor matrix.

In at least one further embodiment, the substrate or the sensors or both are flexible foils that return to their original position after deformation. Due to the elastic properties of the material, the substrate can be adapted to the geometry of any surface and can be adapted to curved surfaces, for example.

Furthermore, the detector can contain additional channels with first, second and further sensors in addition to the first and second channel. The sensors can also be arranged in a matrix, which enables better spatial resolution.

The invention is described in more detail below with reference to examples of embodiments and associated figures.

Similar or apparently identical elements in the figures are marked with the same reference sign. The figures and the proportions in the figures are not to scale.

Figure 1:
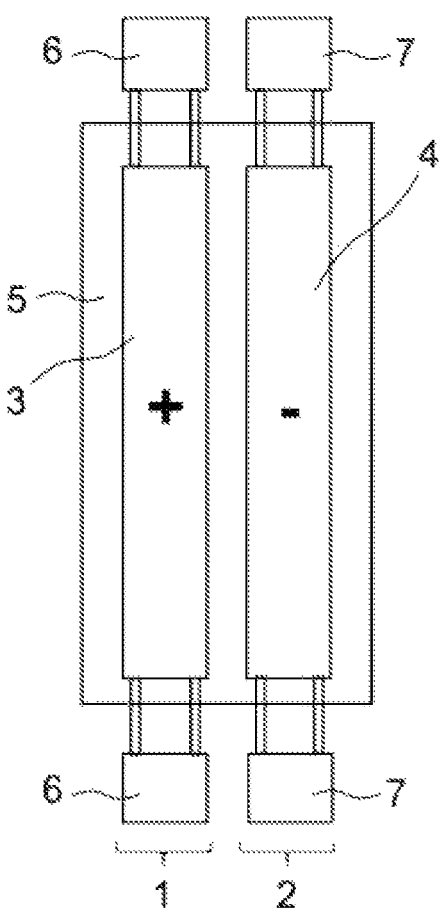
FIG. 1 shows a schematic representation of a dual channel detector with two laterally adjacent sensors of different polarity.

FIG. 1 shows a schematic representation of an embodiment of a detector comprising a first channel 1 and a second channel 2. The first channel comprises a first sensor 3, which has a positive polarity. The second channel comprises a second sensor 4, which has a negative polarity. Both sensors 3 and 4 are applied laterally adjacent to each other on a substrate 5 and are connected at their ends via contact points to evaluation units 6 and 7. The first sensor 3 is connected to first evaluation units 6. The second sensor 4 is connected to second evaluation units 7.

Figure 2:
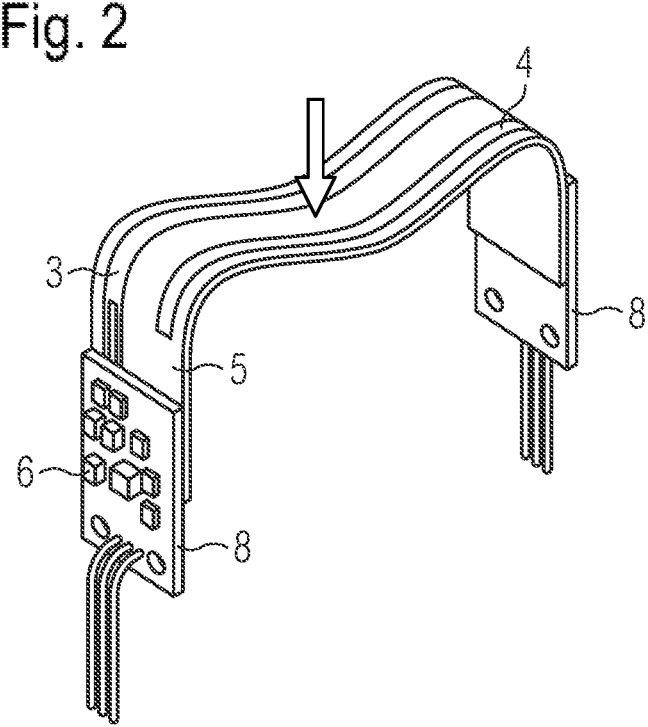
FIG. 2 shows a perspective view of a dual channel detector with two laterally adjacent sensors of different polarity, which is deformed under the impact of force.

FIG. 2 shows a possible specified embodiment of the dual channel detector schematically shown in FIG. 1 for the detection of pressure or contact. The substrate 5, which is made of a plastic such as polyethylene terephthalate (PET) or polyimide (PI), is mechanically flexible. Printed on this are a first sensor 3 with positive polarity and a second sensor 4 with negative polarity. The sensors are also made of mechanically flexible material such as the polymer PVDF and have piezoelectric properties. The electronic evaluation units 6 are located on FR4 boards 8, which are directly applied to the flexible substrate and are connected to the sensors via contact points. If the detector is deformed by a mechanical force (broad arrow), a voltage signal is generated in the piezoelectric sensors. Since both sensors have the same design and are impacted by the same deformation, a measurement signal of the same amount is output from both sensors. Based on the polarity of the measurement signals, a direction-dependent detection of the deformation is possible. However, due to the different polarity of the two sensors, the measurement signals are 180° phase-shifted. This allows simplified error detection without additional components in the downstream electronics or signal processing. Due to its elastic properties, the detector can deform back to its initial state after deformation has occurred.

Figure 3:
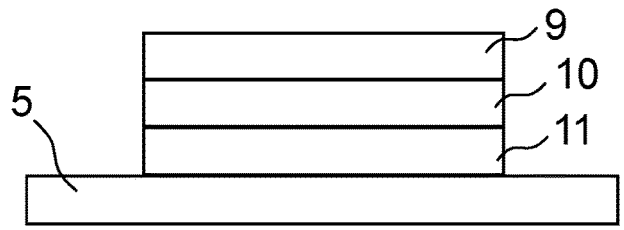
FIG. 3 shows in schematic cross-section an embodiment of a multilayer sensor on a substrate.

FIG. 3 shows a possible multilayer structure of a single sensor. A first layer is a substrate 5, e.g. PET, polyethylene naphthalate (PEN) or PI, on which sensors consisting of the three layers described below are located. A second layer 9 and a third layer 11 comprise electrodes consisting of an electrically conductive material such as chromium, nickel, silver or carbon (graphite), which are applied using conventional surface technologies such as vapor deposition, screen printing or ink jet. An intermediate fourth layer 10 is a ferroelectric functional layer, which can be made of a polymer, a ceramic or a polymer-ceramic matrix. Depending on the material system, the application of the functional layer is adapted (e.g. screen printing, ink jet, spin coating). The polymer can be e.g. PVDF and its copolymers. A possible ceramic is e.g. lead zirconate titanate (PZT).

The evaluation units can be mechanically decoupled from the sensors.

Figure 4:
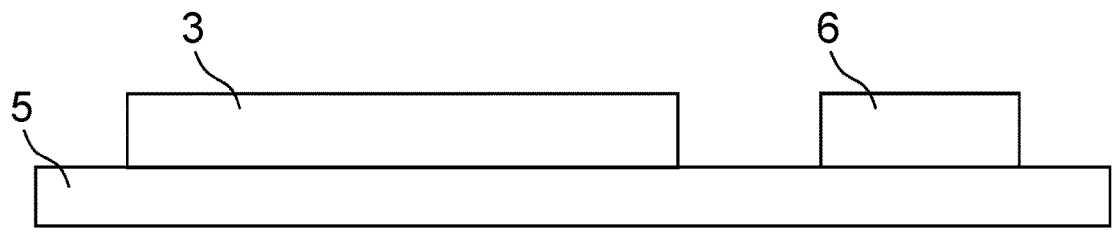
FIG. 4 shows a schematic cross-section of a detector in which sensors and evaluation units are mounted on a flexible substrate.

FIG. 4 shows a schematic cross-section through an example of the detector. Here, a sensor 3 and an associated evaluation unit 6 are applied directly to a flexible substrate 5.

In another embodiment, the evaluation unit may be located on an FR4 board applied to the substrate (not shown in the schematic figure).

Figure 5:
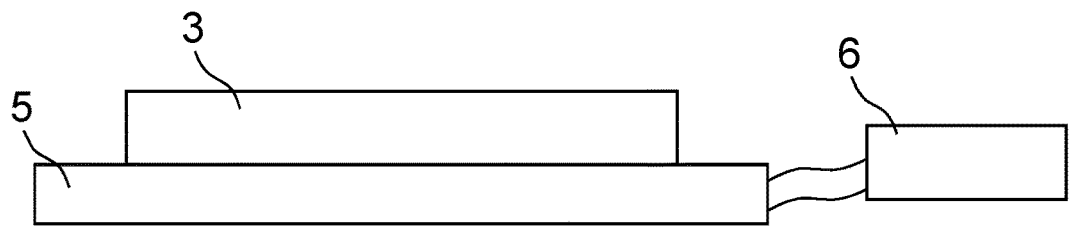
FIG. 5 shows a schematic cross-section of a detector in which sensors and evaluation units are spatially separated but electro-mechanically connected.

FIG. 5 shows a schematic cross-section through a further embodiment of the detector. Here, a sensor 3 is applied directly to the substrate 5. The evaluation unit 6 is spatially separated. The measurement signal is transmitted via an electrical-mechanical connection, but can also be transmitted via a wireless connection (e.g. WLAN, Bluetooth). The evaluation unit can include the following electronic components:

Signal amplifier

Figure 6:
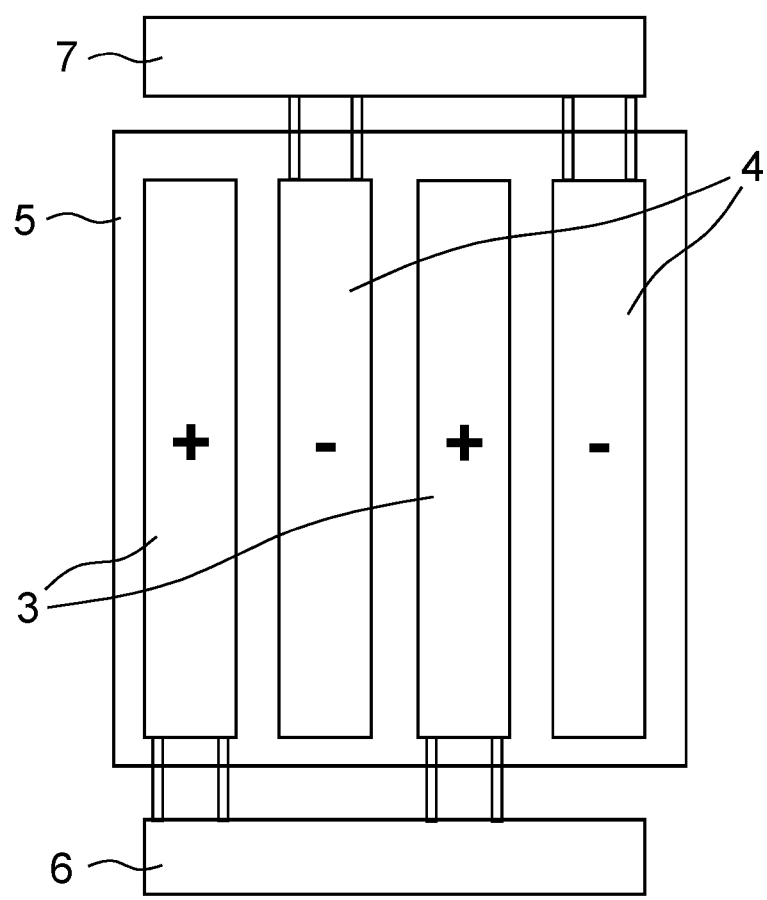
FIG. 6 shows a schematic representation of a multi-channel detector with four laterally adjacent sensors of different polarity.

Comparator
Analog to Digital Converter
Microprocessor(with software installed)
Flash memory
Resistors
Capacitors
Coils
Loudspeaker
Diodes(e.g. rectifiers, light diodes)
Transistors
Antennas
Data connection(e.g. USB interface)
Capacitive measuring bridge FIG. 6 shows a schematic representation of another possible embodiment of a detector comprising multiple channels. Here, the detector comprises two first sensors 3, which have a positive polarity. Furthermore, the detector comprises two second sensors 4, which have a negative polarity. All sensors are applied laterally adjacent to each other on a substrate 5. The first sensors are connected at their end via first contact points to a first evaluation unit 6. The second sensors are connected at their end via second contact points to a second evaluation unit 7. Due to the scalability of the system, each channel can contain any number of sensors. Furthermore, the detector can comprise further channels in addition to the first and second channels, which can comprise any number of sensors.

In another possible embodiment of a detector, its entire structure is encased with an elastic material such as a ferroelectric polymer. The elastic material serves to protect the sensor, for example by damping the expected deformation forces. Due to its mechanical flexibility, the sensor can be adapted to different geometries such as curved surfaces.

LIST OF REFERENCE SIGNS 1 first channel
2 second channel
3 first sensor
4 second sensor
5 substrate
6 first evaluation unit
7 second evaluation unit
8 FR4 board
9 first electrode
10 functional layer
11 second electrode

The invention claimed is:

1. Detector, comprising
a substrate;
a first channel comprising
  a first sensor applied to the substrate, and
  a first evaluation unit connected to the first sensor via a first contact point; and a second channel comprising
  a second sensor applied laterally adjacent to the first sensor on the substrate, and
  a second evaluation unit connected to the second sensor via a second contact point,
wherein the first sensor and the second sensor have identical designs and are each configured to measure an identical physical quantity, and
wherein, in response to a stimulus affecting the first sensor and the second sensor, the first sensor is configured to produce a first measurement signal, and the second sensor is configured to produce a second measurement signal that is equal in magnitude but of opposite polarity to the first measurement signal.

2. Detector of claim 1, wherein the first sensor and the second sensor are configured to detect the physical quantity at an identical time without a time delay between the first sensor and the second sensor.

3. Detector of claim 1, wherein the first and second sensors output phase-shifted measurement signals.

4. Detector of claim 3, wherein the first and second sensors output measurement signals that are 180° phase-shifted with respect to each other.

5. Detector according to claim 1, wherein the sensors and the evaluation units are mechanically decoupled.

6. Detector according to claim 1, wherein the evaluation units, the contact points and parts of the sensors are encapsulated.

7. Detector of claim 1, which is enclosed by an elastic material.

8. Detector of claim 1, wherein each sensor comprises two spaced electrodes disposed on the same or opposite sides of a functional layer, such that the first sensor and the second sensor have separate functional layers.

9. Detector according to claim 8, wherein the electrodes and the functional layer of each sensor are printed on the substrate.

10. Detector of claim 1, wherein the substrate or the substrate and the sensors are flexible foils that return to the original position after deformation.

11. Detector of claim 1, wherein the detector includes, in addition to the first and second channels, further channels having first, second, or further sensors, wherein the further sensors generate a further measurement signal of the same physical quantity as the first and second measurement signals but which is different, and wherein a further evaluation unit is connected to the further sensor via a further contact point.

12. Detector of claim 11, wherein the sensors are arranged in a matrix.

13. Detector of claim 1, wherein a direction-dependent detection takes place during operation of the detector based on the polarity of the measurement signal.

14. Detector of claim 11, which is configured to detect pressure or contact, for which purpose during operation a deformation of the flexible substrate is measured, wherein the first sensor and the second sensor are made of a mechanically flexible materials and have piezoelectric properties.

15. Detector of claim 1, wherein the first sensor and the second sensor are configured to generate the first and second measurement signals in response to an identical physical deformation of the substrate.

16. Detector of claim 15, wherein the first sensor includes a first functional layer that is disposed between a first pair of electrodes, and the second sensor includes a second functional layer that is disposed between a second pair of electrodes and is separate from the first functional layer, and wherein the identical physical deformation of the substrate causes an identical deformation of the first functional layer and the second functional layer such that the first and second measurement signals are of equal magnitude.

* * * * *